United States Patent
Sommer et al.

(10) Patent No.: US 6,732,285 B1
(45) Date of Patent: May 4, 2004

(54) METHOD AND DEVICE FOR CONTROLLING PROCESSES IN CONJUNCTION WITH A DRIVE

(75) Inventors: Rainer Sommer, Stuttgart (DE); Markus Stober, Schwieberdingen (DE); Taskin Ege, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 582 days.

(21) Appl. No.: 09/672,891

(22) Filed: Sep. 28, 2000

(30) Foreign Application Priority Data

Sep. 30, 1999 (DE) .......................... 199 47 251

(51) Int. Cl.⁷ ................................. G06F 1/26
(52) U.S. Cl. ........................... 713/330; 701/48
(58) Field of Search ............... 713/330; 701/48; 123/198 DC

(56) References Cited

U.S. PATENT DOCUMENTS

| | | | | |
|---|---|---|---|---|
| 5,151,855 A | * | 9/1992 | Gray et al. ............... | 713/330 |
| 5,522,350 A | * | 6/1996 | Hollis ....................... | 123/41.1 |
| 5,714,946 A | * | 2/1998 | Gottshall et al. .......... | 340/870.16 |
| 6,138,059 A | * | 10/2000 | Ozeki et al. ................ | 701/1 |
| 6,421,593 B1 | * | 7/2002 | Kempen et al. ............ | 701/48 |
| 6,577,934 B2 | * | 6/2003 | Matsunaga et al. ........ | 701/29 |

FOREIGN PATENT DOCUMENTS

DE  33 27 376  2/1985

* cited by examiner

*Primary Examiner*—Thomas Lee
*Assistant Examiner*—Albert Wang
(74) *Attorney, Agent, or Firm*—Kenyon & Kenyon

(57) ABSTRACT

A method and a device for controlling processes with the help of process quantities in conjunction with a drive, in particular an engine for driving a vehicle, the processes being executed and controlled at the time the drive is shut off and/or thereafter, and the power supply to the processes and control being maintained by an energy storage devices at the time the drive is shut off and/or thereafter, the processes being controlled by at least two processors and the first processor disconnecting the at least second processor and itself from the power supply when the process quantities of the processes assigned to the respective processors each meet at least one predefinable condition.

11 Claims, 3 Drawing Sheets

METHOD AND DEVICE FOR CONTROLLING PROCESSES IN CONJUNCTION WITH A DRIVE

BACKGROUND INFORMATION

The present invention relates to a method and a device for controlling processes in conjunction with a drive, in particular an engine in a motor vehicle, the processes being executed and controlled at the time the drive is shut off and/or thereafter. German Published Patent Application No. 33 27 376 describes a method and a device for controlling the position of the throttle valve in the intake pipe of an internal combustion engine. When the throttle valve is shut off, it is initially moved to the closed position for a predefined period of time and thereafter it is opened again. Current supply for an appropriate electronic control unit is maintained for this purpose by a timing element after the internal combustion engine is shut off. Thus the internal combustion engine is safely shut off without subsequent uncontrolled combustion, and subsequent reopening prevents the throttle valve being cooled from seizing. The first control unit, which controls the defined timing of valve opening and closing, is disconnected from the power supply by a timing element during after-run.

When multiple processors or controllers are used, the use of a timer element represents a problem due to the lack of coordination of the processors, because problems may occur due to a sudden loss of power supply triggered by a timer element when critical processes are run by a plurality of uncoordinated processors. Thus the related art cannot provide a method that is optimum in all respects.

SUMMARY OF THE INVENTION

Therefore, an object of the present invention is to have each processor or each controller perform their functions independently in the after-run phase and yet carry out after-run termination, i.e., the disconnection of the control units from the power supply, in a coordinated manner.

The present invention is based on a method and a device for controlling processes with the help of process quantities in conjunction with a drive, in particular an engine in a motor vehicle, the processes being executed and controlled at the time the drive is shut off and/or thereafter, and power supply being maintained by at least one energy storage device at the time the drive is shut off and/or thereafter. The processes are controlled by at least two processors or controllers, the first processor disconnecting the at least second processor from the power supply or shutting it down when the process quantities meet a predefinable condition. The process quantities and/or the at least one predefinable condition are transmitted by the second processor to the first processor. Subsequently the first processor evaluates the transmitted information of the second processor and its own process quantities and the conditions they are to meet and disconnects itself, as well as the controlled system from the power supply by the at least one energy storage device.

The end of the process runs or their control is advantageously represented by the process quantities or the predefinable conditions, so that when the system is shut off it can be ensured that all processes, including the safety-critical processes, are brought to an end in a controlled manner before the power supply is disconnected.

By using several processors and coordinating after-run shutoff through them, various functions can be run by the individual processors even during after-run. Thus advantageously a separation of functions in the controller and safe shutoff are possible.

If no time condition is used as a condition, it is conveniently not necessary that the processing times of the individual after-run functions be known, for example, in order to set a timer element accordingly. Thus, even unforeseen events, which extend the time of the after-run function runs, for example, do not impede a coordinated, controlled, and safe shutoff.

Due to the coordinated shutoff only when the controlled processes have reached a safe status, it is advantageously not necessary that the after-run functions be symmetrically distributed among the processors or even the tolerances of components or applicable data in designing the system be taken into consideration.

Thus, after-run time is always the shortest possible under the different operating conditions, i.e., power supply is always shut off as soon as possible. Excess power consumption and therefore unintended depletion of the at least one energy storage device in the vehicle, in particular the vehicle battery, is thus advantageously avoided. If after-run shutoff is expediently carried out by one of the processors, a common after-run power supply can be used for all processors or the complete digital portion and/or additional circuit components, in particular the controlled system, resulting in advantages concerning the complexity and cost of the hardware circuitry.

Since the interfaces between the processors are present anyway, typically for information exchange, also the information allowing coordination of the after-run shutoff can be transmitted through these interfaces, so that no additional hardware is necessary.

An additional advantage is that the at least two processors can be arranged in any desired manner, i.e., they can also be advantageously distributed over multiple controllers. Thus coordination of the after-run shutoff advantageously takes place so that information between the controllers is reliably exchanged.

DETAILED DESCRIPTION

Figure 1:
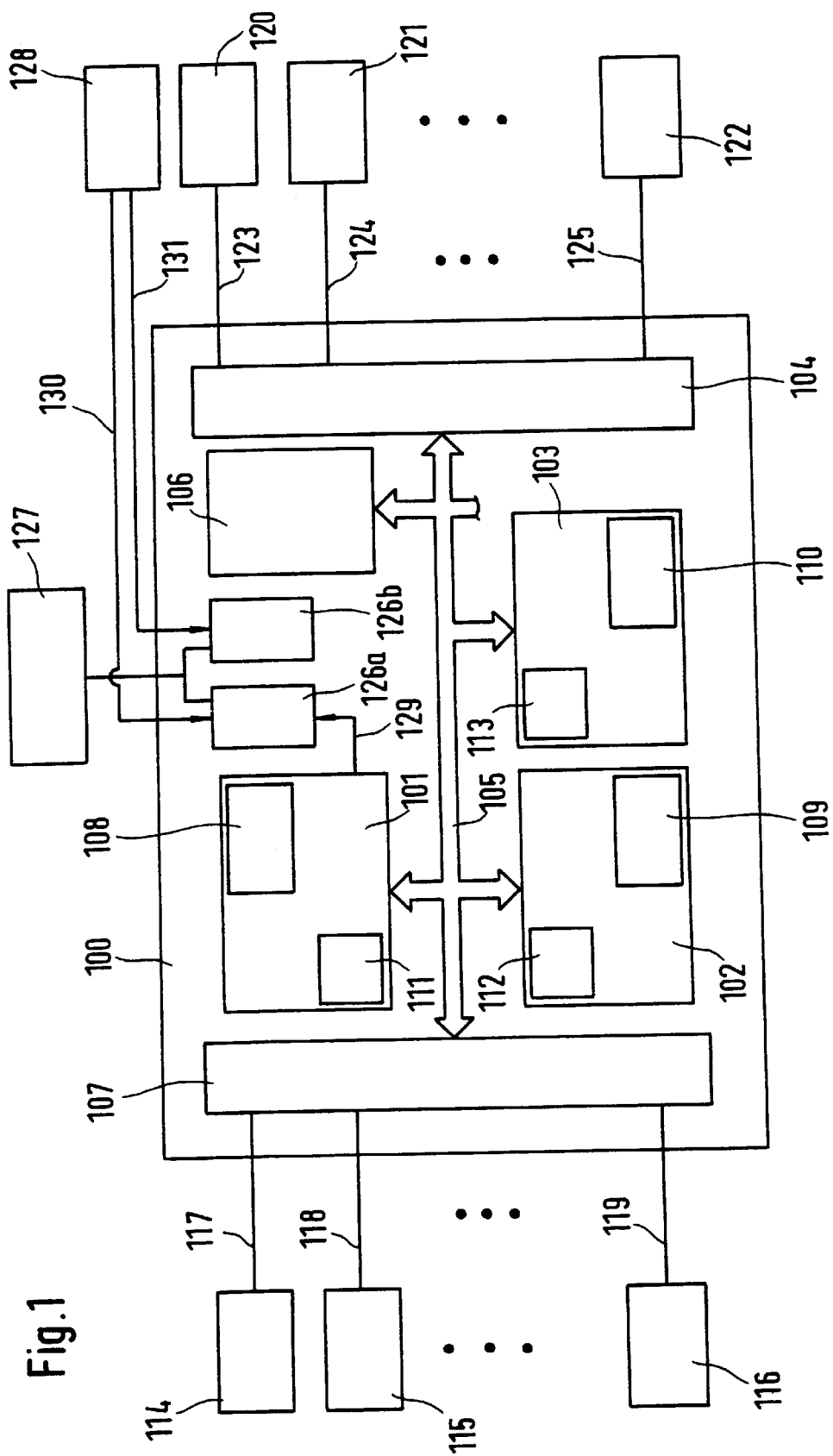
FIG. 1 shows a generic process control system in a motor vehicle, in particular for engine control.

FIG. 1 shows an electronic controller 100 which has at least two computers 101 and 102, an input module 107, an output module 104, as well as a bus system 105. An additional computer 103 in controller 100 is shown to better illustrate the different embodiments according to the present invention. Therefore the number of processors in the controller is at least two. Optionally additional components and/or assemblies, represented by element 106, can be connected to bus system 105. These additional optional elements are, for example, additional storage elements and/or an additional input or output interface of communications system 105, in particular for diagnosis or for connecting controller 100 to other controllers via communications system 105, etc.

Input module 107 can also be combined with output module 104 as an input/output module. Computer 101 contains, among other things, a processor 111 and a program memory 108 assigned to this processor 111. The program code stored in program memory 108 includes, among other things, the programs for controlling the processes of the vehicle and the programs for the after-run shutoff according to the present invention. The program codes stored in program memories 108 through 110 thus correspond to the possible functions regarding the control of the processes that can be run by processors 111 through 113. Program memories 109 and 110, as well as the respective processors 112 and 113, are arranged in the corresponding computers 102 and 103.

The at least two processors or computers do not need to be arranged in one controller as illustrated here, but may be distributed over a plurality of controllers or additional control computers. This also ensures coordinated shutoff of multiple controllers and reliable information exchange between the controllers.

Input module 107 receives signals corresponding to measured and/or derived process quantities or operating quantities of the vehicle processes. All processes to be controlled in the vehicle such as engine control, transmission control, chassis control, in particular brake control, small motor control, for example, for power windows and/or sunroof unit; control of other actuators such as electronic door locks etc. are conceivable. In particular, these are process quantities or operating quantities that can be analyzed for controlling an internal combustion engine.

The above-mentioned signals are detected by measuring devices 114 through 116, in particular sensors, and supplied to input module 107 via input lines 117 through 119. Process quantities can also be formed in the individual measuring devices, for example, from additional measured quantities. The information corresponding to the signals is supplied to communications system 105 via input module 107. In addition, signals that actuate actuators 120 through 122 to set at least one operating quantity or process quantity of the respective controlled system, in particular of the internal combustion engine of the vehicle, are output via output module 104. The corresponding signals for triggering actuators 120 through 122 are transmitted via output lines 123 through 125. Depending on the input signals or the operating quantities or process quantities derived therefrom and/or internal quantities, computers 101 through 103 form values for the control quantities to be output using the programs implemented in computers 101 through 103; these control quantities set actuators 120 through 122 according to a predefined control strategy.

In a preferred embodiment, controller 100 is a control unit for controlling a drive unit, in particular an internal combustion engine of a vehicle. The position of a control element actuated by the driver is detected in a known manner, for example, is analyzed, and a setpoint value is determined for the torque of the drive unit. This setpoint value for the torque can also be determined taking into consideration setpoint values of other control systems such as that of the drive slip control, transmission control, etc., received via input module 107, as well as internally formed setpoint values (limit values, etc.). In this preferred embodiment of an internal combustion engine control, this setpoint value can then be converted into a setpoint value for the position of the throttle valve which is set using a position control circuit. Furthermore, depending on the design of the internal combustion engine, additional functions that determine engine power are provided, for example, control of a turbocharger, an exhaust gas recirculation system, an idling speed control, etc. In addition, for example, in internal combustion engines having direct gasoline injection, not only the control of air flow rate, but also that of fuel flow rate, air/fuel ratio, injection sequence (pre-injection, post-injection), charge motion valve, etc. are relevant for determining the engine power, so that in addition to the program mentioned above, a plurality of additional programs are provided for process control, which affect the engine power of the internal combustion engine and thus the safety of the vehicle. This plurality of processes and programs that control these processes are and/or can be stored in the respective program memories of computers 108 through 110.

The above-mentioned processes and other processes can be tested, for example, during after-run. It is also conceivable that additional safety functions be performed when the drive has recently been put in service. The processes to be performed in after-run, i.e., at the time the drive is shut off and/or thereafter, may have begun previously and are brought to an end during the after-run.

Controller 100 is supplied with power from element 127, which is an energy storage device, in particular at least one battery of a vehicle. Instead of one energy storage device, in particular the vehicle battery, a plurality of energy storage devices may also be provided. Controller 100 can also be supplied with power, at least during after-run, by the at least one energy storage device, for example, located in the controller or in one controller, instead of the vehicle battery. Assigning this power supply to one energy storage device for each computer or processor, for example, to this computer or processor and arranging it in the vicinity of the processors or computers is also conceivable.

Element 126a and element 126b are two switching elements which can interrupt the power supply from energy storage device 127 to controller 100. Switching elements 126a and 126b, implemented for example as simple switches or as unipolar or bipolar transistors, are arranged in this embodiment so that one conducting switching element is sufficient to supply controller 100 with power from energy storage device 127. Controller element 128 is a gate switch, a start switch, or an ignition switch, for example, which has or addresses an internal logic. This internal logic is used to activate the two switching elements 126a and 126b via lines 130 and 131 so that when the start switch or ignition is turned on, or as an alternative when the door is opened, both switches 126a and 126b are closed and thus controller 100 is supplied with power via redundant paths. When the drive is turned off, however, only switching element 126b is opened. Thus the controller continues to be supplied with power during after-run through closed switching element 126a. Therefore, when the drive is turned off, only switch 126b is opened via line 131, while switch 126a is or remains closed, whereby power supply is maintained. Via control line 129, computer 101 can also actuate switching element 126a and thus disconnect the controller or individual computers 101 through 103, in particular processors 111 through 113, from the power supply in after-run.

For cost reasons, in this embodiment only computer 101 is capable of suppressing the supply of power. In general, however, it is also conceivable that each computer 101 through 103 be capable of suppressing the supply of power separately via a respective switching element arrangement and thus also individually for the individual computers or processors and/or additional circuit components. Instead of via control line 129, intelligent switching elements 126a or 126b can also be connected and thus activated via internal communications system 105.

Thus, in the case of an engine controller of FIG. 1, the drive itself is turned off by control element 128, while controller 100 continues to be supplied with power via switching element 126a. Therefore, after the ignition or the start switch has been turned off, a controller after-run or computer after-run takes place in that the power supply to the digital portion and, if necessary, to other circuit parts continues and different functions or processes are capable of running. These processes include, for example, engine deceleration recognition, determination of shutoff operating quantities, error storage management, transfer of quantities into a non-volatile memory, etc. Thus individual processes can be independently controlled in the after-run phase by each computer 101 through 103 or the respectively assigned microprocessors 111 through 113, as indicated.

The same is true, for example, for the case when operating element 128 is a door lock switch which activates, for example, power window or sunroof drives when the door is closed, and at least one of computers 101 through 103 verifies the status of the windows in after-run when the windows are closed.

Figure 2:
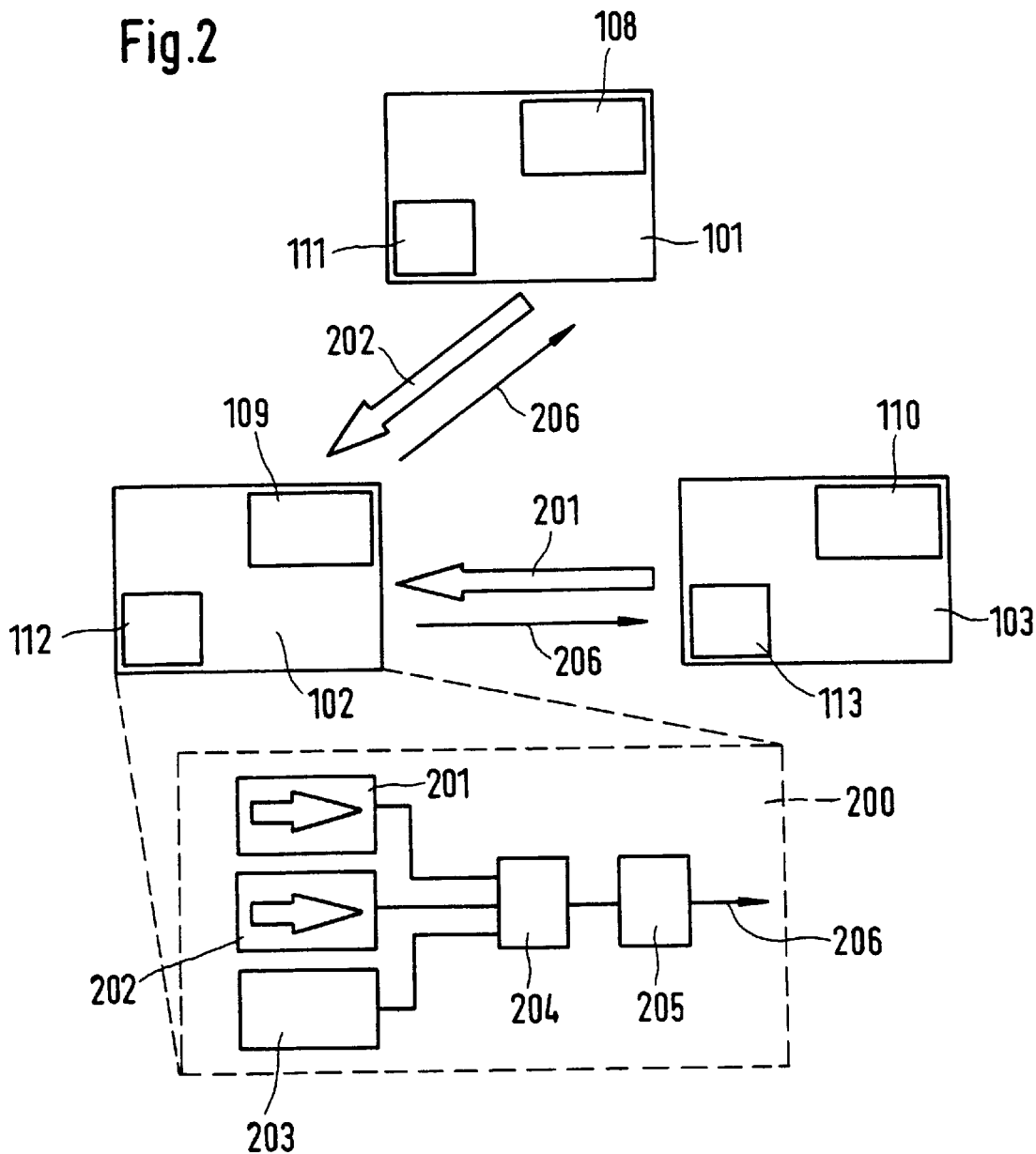
FIG. 2 shows a design for after-run shutoff having three processors with different possible variants.

One variant of after-run coordination is illustrated in FIG. 2. Computers 101 through 103 in controller 100 contain processors 111 through 113 and memories 108 through 110 as mentioned before. As previously mentioned, the processes or function sequences can be controlled in after-run in each computer independently from one another. In practice, after-run lasts for a few seconds or even many minutes depending on the different operating conditions, among other things.

Holding and turning off the power supply for two or more computers or processors is controlled by one processor; however, after-run shutoff is coordinated between at least two of the processors. After-run shutoff can be coordinated, for example, so that computer 101 and computer 103 send information 201 and 202, respectively, to computer 102, informing it that they are done with their after-run function runs or process runs. Computer 102 can then decide, taking into account its own after-run processes, when after-run is to be terminated. For this purpose, computer 102 receives information 201 of computer 103 and information 202 of computer 101 regarding the after-run process run, for example, process quantities or quantities obtained by their analysis, as shown in function block 200. In addition to this information 201 and 202, computer 102 takes into consideration its own after-run process information 203. The signals representing information 201 and 202 as well as information 203 are gated in element 204. This gating 204 may correspond, in the simplest case, to an AND-logic/gating regarding information 201, 202, and 203. A two-out-of-three selection of information 201 through 203 or taking into account a maximum after-run time can also be used. The instantaneous state of the function or process runs, for example which partial processes have been terminated, can also be transmitted to computer 102 as information of computers 101 and 103, and taken into account in the after-run coordination in computer 102.

For example, if a time condition and coordination information are used simultaneously, a priority of the partial processes may be taken into account as the power supply is shut off. Depending on their relevance for safety, different priority levels are assigned to the partial processes. Certain partial processes having a lower priority need not necessarily be carried out for safe shutoff, for example. Thus the disconnection of the power supply can also be coordinated during after-run when a predefinable period of time has elapsed and critical priority levels or their partial processes have been terminated without need for running all possible processes in after-run.

After the information has been gated and analyzed in block 204, this block may issue a shutoff request. This request is then processed in block 205 according to the application. Processed shutoff signal 206 can be used as acknowledgment information for computers 101 and 103, as shown in FIG. 2, to inform them that they are to be shut off, as well as a signal over line 129 in FIG. 1 for operating switching element 126a. After-run shutoff does not need to be performed directly by computer 102. Computer 102 can forward the coordinated information from element 204 or the processed shutoff signal from element 205 to another computer, which then performs the shutoff. Acknowledgment information 206 can also be used for this purpose.

Figure 3:
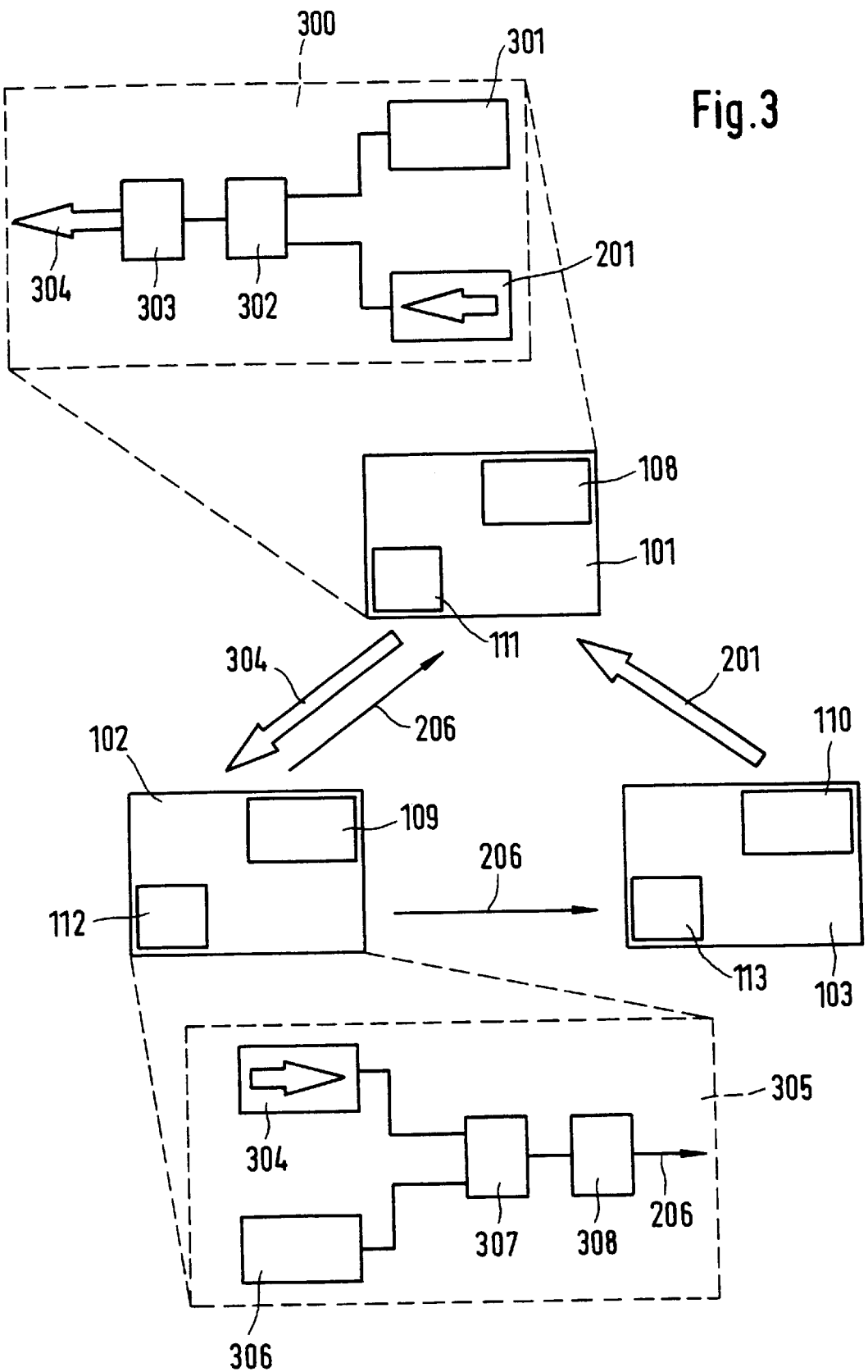
FIG. 3 shows a second design for after-run shutoff, also with variants.

As shown in FIG. 3, coordination of after-run shutoff does not necessarily have to be performed in a computer or a processor as a single step. Thus, as an additional embodiment, process information 201 or the process quantities from computer 103 are transmitted to computer 101. Function block 300 illustrates the processing in computer 101. Process information 201 of computer 103 is gated there with process information 301 of computer 101 itself in block 302, i.e., they are evaluated together. This may take place in function block 200 in a similar manner. Information analysis delivers a signal or a message to block 303 which processes it into process information 304, which now contains the process information of computers 101 and 103, and transmits it to computer 102.

Computer 102 coordinates, i.e., gates process information 304 as well as its own process information 306 via block 307 in function block 305, generating a signal or a message/information for block 308. Block 308 in turn issues an information acknowledgment 206 of the processed signals from block 307. This information acknowledgment may in turn be a shutoff signal in the simplest case. It is then transmitted by computer 102 to the two computers 101 and 103 as shutoff information or may influence, at the same time or alternatively, switching element 126a over signal path 129 and disconnect the power supply. Thus the information from computers 101 and 103 is coordinated in computer 101 and this partial information is forwarded to computer 102 in the form of process information 304; subsequently computer 102 performs the overall coordination and after-run shutoff.

In another embodiment, the computers to be shut off, which received information acknowledgment 206, send another control acknowledgment to the computer which coordinates the overall coordination and ultimately the after-run shutoff prior to or at the time of shutoff.

When actuation of switching elements 126a and 126b as described above disconnects controller 100, i.e., the computers or processors as a whole from the power supply, the respective computer or processor can be shut off using information 206 at least in such a manner that it is in a standby state, i.e., it is no longer active and accepts no more control tasks.

In addition, also parts of the controller, in particular the computers or processors, can be provided with their own power supplies or connections to the energy storage device. In that case the processor performing after-run coordination can shut off the respective parts entirely by disconnecting them from the power supply. This makes cascading shutoff of the controller possible. In particular, each computer or processor can be completely and individually shut off when it has run the processes assigned to it in after-run.

Shutoff as disconnection from the power supply of the computers or processors thus takes place either in the one step or in a cascading manner. If shutoff takes place in one step, the computers or processors that do not perform after-run coordination are brought to a standby state in advance, i.e., a passive waiting state, by the computer performing after-run coordination or after-run shutoff before ultimately all computers or processors are disconnected from the power supply. The standby state then corresponds to the shutoff of the respective computer which is brought to the safe state, although the controller as a whole is still supplied with power.

What is claimed is:

1. A method for controlling processes with process quantities in conjunction with a drive, comprising the steps of:

executing and controlling the processes at least one of a time when the drive is shut off and a time thereafter, the processes being controlled by at least two processors including at least a first processor and a second processor;

causing at least one energy storage device to maintain a power supply to the processes and a process control at least one of the time when the drive is shut off and the time thereafter; and causing the first processor to disconnect the first processor and the second processor from the power supply when the process quantities of the processes assigned to respective ones of the at least two processors each meet at least one predefinable condition, wherein only the first processor determines whether all of the process quantities have met the at least one predefinable condition.

2. The method according to claim 1, wherein:

the drive corresponds to an engine for driving a vehicle.

3. The method according to claim 1, wherein:

the first processor disconnects the first processor and the second processor from the power supply at the earliest when the process quantities of the processes assigned to respective ones of the at least two processors each indicate an end of the process control and the second processor has communicated the end of the process control to the first processor.

4. The method according to claim 1, wherein:

the first processor disconnects the first processor and the second processor from the power supply after a lapse of at least one predefinable time period.

5. The method according to claim 1, further comprising the steps of:

assigning different priorities to the processes;

causing the first processor to disconnect the first processor and the second processor from the power supply when the process quantities of higher priority processes assigned to respective ones of the first processor and the second processor each indicate an end of the process control and the second processor has communicated the end of the process control of the higher priority processes to the first processor.

6. The method according to claim 1, wherein:

the first processor disconnects the first processor and the second processor after a predefinable time only when the process quantities of higher priority processes assigned to respective ones of the at least two processors each indicate an end of the process control and the second processor has communicated the end of the process control of the higher priority processes to the first processor.

7. The method according to claim 1, further comprising the steps of:

causing more than the at least two processors to control the processes;

causing at least a third processor to communicate to the second processor that a respective one of the at least one predefinable condition of the process quantities has been met;

causing the second processor to communicate to the first processor that the respective one of the at least one predefinable condition of the process quantities of the third processor and the second processor has been met; and causing the first processor to disconnect the first processor, the second processor, and the third processor from the power supply at the earliest when the process quantities of the processes assigned to respective ones of the at least two processors have each met at least one of the at least one predefinable condition.

8. The method according to claim 1, wherein:

each one of the at least two processors disconnects the first processor and the second processor from the power supply when the process quantities each meet one of the at least one predefinable condition.

9. The method according to claim 1, further comprising the step of:

initially switching at least one of the second processor and a third processor into a passive standby state; and after performing the switching step, causing the first processor to simultaneously disconnect each one of the at least two processors from the power supply when the process quantities each meet the at least one predefinable condition.

10. A device for controlling processes with process quantities in conjunction with a drive, comprising:

a first arrangement for executing and controlling the processes at least one of a time when the drive is shut off and a time thereafter; and at least one energy storage device for maintaining a power supply at least one of the time when the drive is shut off and the time thereafter, wherein:

the first arrangement includes at least two processors for controlling the processes, the at least two processors include a first processor and a second processor, the first processor disconnects the first processor and the second processor from the power supply when the process quantities of the processes assigned to respective ones of the at least two processors each meet a predefinable condition, and only the first processor includes an arrangement for determining whether all of the process quantities have met the predefinable condition.

11. The device according to claim 10, wherein:

the drive corresponds to an engine for driving a vehicle.

* * * * *